United States Patent
Nakano

[11] Patent Number: 5,843,489
[45] Date of Patent: Dec. 1, 1998

[54] SCREW FOR AN EXTRUDER

[75] Inventor: Hiromi Nakano, Takasago, Japan

[73] Assignee: Kabushiki Kaisha Kobe Seiko Sho, Kobe, Japan

[21] Appl. No.: 859,040

[22] Filed: May 20, 1997

[30] Foreign Application Priority Data

May 20, 1996 [JP] Japan ................................. 8-124555

[51] Int. Cl.⁶ .................................................. B29C 47/82
[52] U.S. Cl. .................... 425/208; 425/378.1; 425/379.1
[58] Field of Search ............................. 425/208, 378.1, 425/378.2, 379.1

[56] References Cited

U.S. PATENT DOCUMENTS

| | | | |
|---|---|---|---|
| 1,951,427 | 3/1934 | Lodge | 425/379.1 |
| 1,964,681 | 6/1934 | Williams | 425/378.1 |

FOREIGN PATENT DOCUMENTS

| | | |
|---|---|---|
| 2 057 989 | 6/1971 | Germany . |
| 1 604 394 | 8/1972 | Germany . |
| 24 59 209 | 6/1976 | Germany . |
| 57-65817 | 4/1982 | Japan . |
| 58-133417 | 9/1983 | Japan . |

*Primary Examiner*—Tim Heitbrink
*Attorney, Agent, or Firm*—Oblon, Spivak, McClelland, Maier & Neustadt, P.C.

[57] ABSTRACT

An extruder that can control the temperature on the whole screw including the flight and avoid an extruded material form adhering on a surface of the screw, has a center hole with its front end closed formed in the center of the screw core, and an inner tube inserted in the center hole from the base end side of the center hole. The front end of the inner tube opens at a position corresponding to the base end of the flight. A ring seal member occludes a space between a front outer surface of the inner tuber and the corresponding inner surface of the center hole. Thus, a main channel of a dual tube is formed which has an outward channel inside the inner tube and an inward channel outside the inner tube. On the other hand, on the back side of the flight, a jacket-form spiral channel is formed along the whole backside. The front end and the rear end of the spiral channel each communicate with the outward channel and inward channel of the main channel, respectively, through radial communicating holes.

3 Claims, 2 Drawing Sheets

SCREW FOR AN EXTRUDER

BACKGROUND OF THE INVENTION

1. Field of the Invention

The present invention relates to a screw for an extruder, particularly to a screw for an extruder in which a medium channel for heat exchange is incorporated to control the surface temperature of the screw.

2. Description of the Related Art

In an extruder for extruding a high polymer material such as a knead rubber or resin to a sheet forming roller or die, to control the temperature of an extruded material and the screw is a key factor for stably and smoothly extruding an extruded material. If the temperature of an extruded material varies beyond a specific range in an extrusion process, shaping in the forming die will become unstable. On the other hand, if the temperature of the screw is inappropriate to the temperature of an extruded material, the extruded material adheres on a surface of the screw, which leads to burning or coagulation due to a frictional heat produced between a rotating screw and a flowing extruded material. The burned or coagulated part of the material mixes with a subsequent extruded material, which makes a contaminant to degrade quality of the molded.

In order to avoid this contamination, as shown in FIG. 2(a) in an example, a dual axis extruder with roller heads is devised which extrudes a rubber or resin kneaded by a mixer (M) to a sheet forming roller (R). As shown in FIG. 2(b), as a top sectional view, this dual axis extruder is provided with a dual tube channel (11) having an outward channel (11a) and an inward channel (11b) formed in the center of cores (10a) of a screw (10). The temperature of the screw (10) and an extruded material are designed to be controlled by introducing a medium (heat medium or refrigerant) such as a temperature regulated water into this dual tube channel (11) and by performing a heat exchange.

However, in the foregoing conventional screw, the temperature of a flight (10b) having a large contact area with an extruded material is controlled, not by a direct heat exchange with a medium, but by an indirect heat transfer through the cores (10a). Therefore, a temperature difference between the cores (10a) and the flight (10b) is inevitably produced. Accordingly, it is extremely difficult to acquire a uniform temperature control on the whole body of the screw (10), especially, the temperature on the flight (10b) is difficult to appropriately control, so that an extruded material is likely to adhere on a surface of the flight (10b).

Further, in order to ease this temperature difference, a temperature regulated medium has to be fed into the channels to soak the screw under a stabilized condition for a certain period of time. Accordingly, a comparably log time soaking operation is inevitable, and yet it is difficult to immediately follow fluctuations of an extrusion condition, consequently decreasing the production efficiency.

SUMMARY OF THE INVENTION

The present invention has been made to solve the foregoing problem, and an object of the invention is to provide a screw for an extruder, whereby the temperature on the whole body of the screw including the flight can be controlled uniformly stably so as to avoid an extruded material from adhering on the screw, and accordingly, stabilized quality and increased production efficiency can be achieved.

In order to accomplish the foregoing object, the present invention takes on the following construction. Namely, a screw for an extruder relating to the invention is provided with a main channel of a dual tube that has an outward channel and an inward channel in the center of the core of the screw, and a jacket-form spiral channel that is formed on and along the back side of the screw flight. Further, each end of the spiral channel communicates with the outward channel and the inward channel of the forgoing main channel, respectively.

According to the foregoing screw of the invention, a medium such as a temperature regulated water is fed through the main channel in the screw core and the medium is circulated not only in the screw core as in the conventional example, but also in the spiral channel formed on the back of the screw flight which communicates with the outward channel and the inward channel of the main channel on each end of the spiral channel. Thus, the temperature of the flight can be controlled by a direct heat exchange between the medium and the flight.

Namely, the screw of the invention circulates a temperature regulated medium in the main channel of the core and in the spiral channel of the flight, and the direct heat exchange between the medium and the screw including the flight controls the temperature of the whole screw including the flight uniformly stably, thus avoiding an extruded material from adhering on the screw.

Further, the temperature of the flight is controlled, not by a heat transfer through the core as the conventional example, but by a direct heat exchange between the medium and the flight; and therefore, a rise time at starting the operation can significantly be shortened compared to the conventional, and variations of an extrusion condition can immediately be followed. Thus, the production efficiency can be enhanced.

DESCRIPTION OF THE PREFERRED EMBODIMENT

Preferred embodiments of the present invention will hereafter be described with reference to the accompanying drawings.

Figure 1:
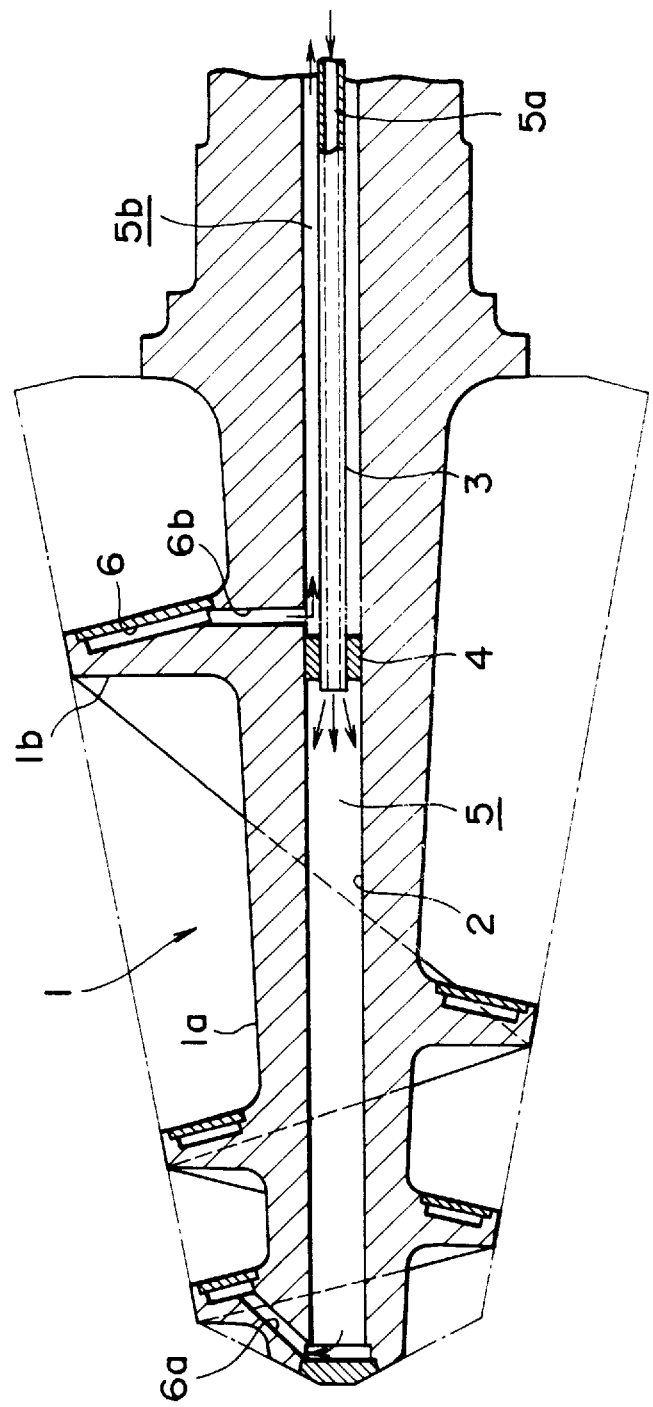
FIG. 1 is a front sectional view showing one embodiment of a screw for an extruder relating to the present invention.

FIG. 1 is a front sectional view showing one embodiment of a screw for an extruder relating to the invention. This embodiment is an example in which the construction of the screw relating to the invention is applied to the foregoing screw for the dual axis extruder.

A screw (1) of this embodiment shown in FIG. 1 is provided with a front conical core (1a) and a flight (1b) formed thereon, and the flight (1b) is served as a rotor to extrude an extruded material.

Figure 2A:
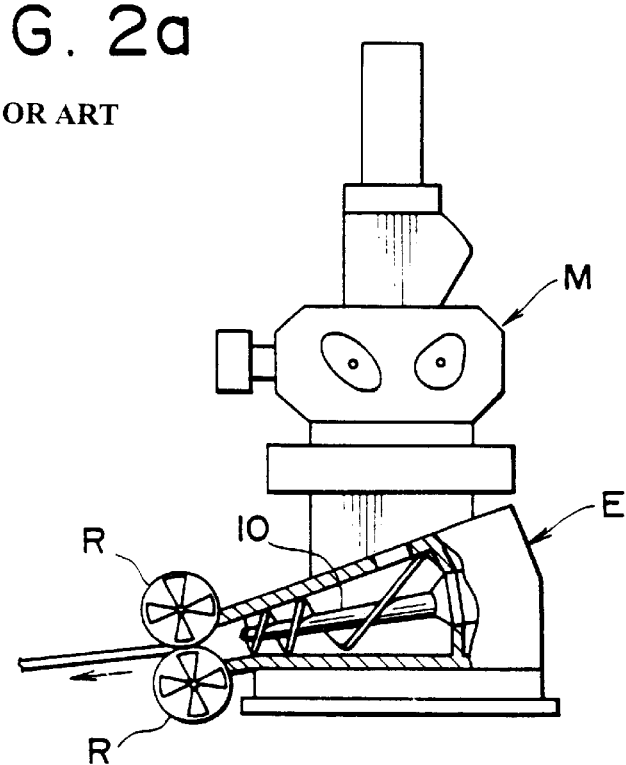
FIGS. 2A and 2B are an illustration for explaining a disposition and construction of a conventional screw for an extruder.
Figure 2B:
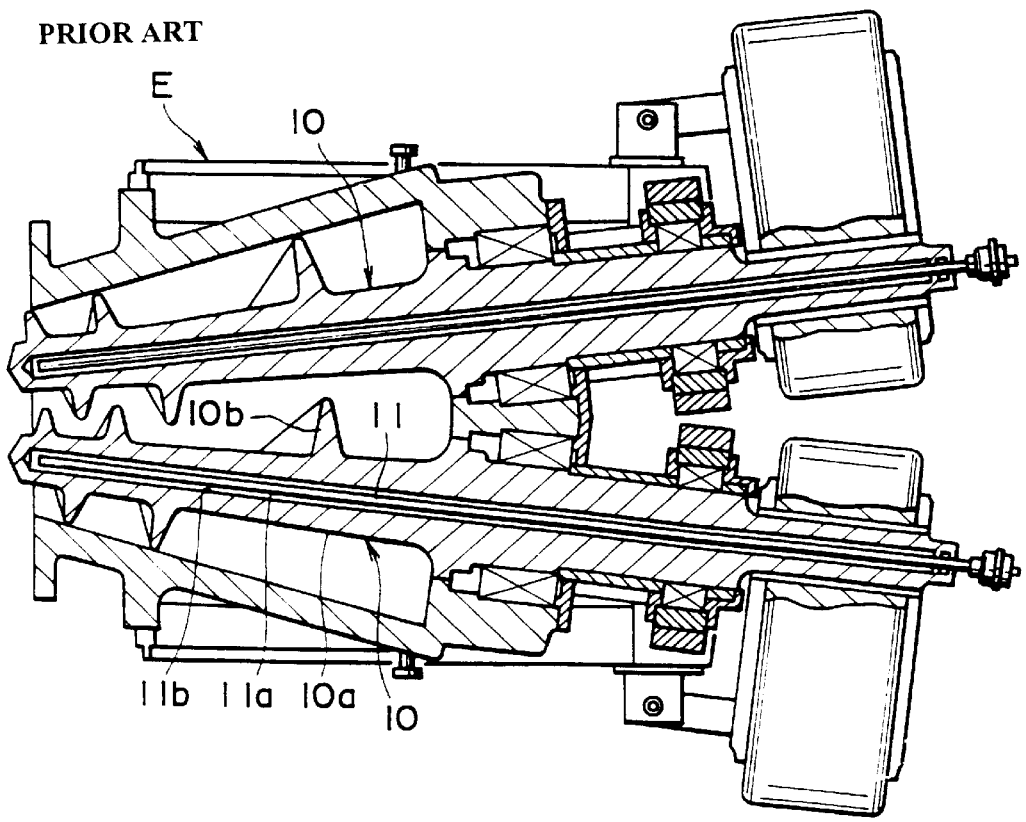

Although not illustrated here in FIG. 1, a rear support base of this screw has the same construction as the one shown in FIG. 2(a), and the two screws of the same shape form a pair to be incorporated into an extruder body.

Further, in the center of the screw core (1a), a center hole (2) with its front end closed is formed, and an inner tube (3) is inserted in the center hole (2) from the base end side of the center hole (2). The front end of the inner tube (3) opens at a position corresponding to the base end of the flight (1b). A ring seal member (4) occludes a space between a front outer surface of the inner tube (3), and an inner surface of the center hole (2). Thus, a main channel (5) of a dual tube is formed which has an outward channel (5a) formed inside the inner tube (3) and an inward channel (5b) outside the inner tube (3).

Further, although not illustrated here, the outward channel (5a) and the inward channel (5b) of the main channel (5) are connected to an outer medium supply system through a rotary socket attached to the rear end of the screw (1)

On the other hand, on the back side of the flight (1b), a jacket-form spiral channel (6) is formed along the whole backside. The front end and the rear end of the spiral channel (6) each communicate with the front end of the center hole (2) and the inward channel (5b) between the inner surface of the center hole (2) and the inner tube (3), respectively, through a radial communicating hole (6a) and (6b).

The spiral channel (6) in this embodiment is formed such that a shallow channel having a rectangular sectional form is bored continuously along the back side of the flight (1b) and a strip sheet steel is welded to cover the opening. Thus, the sealed jacket-form spiral channel (6) is formed on the back side of the flight (1b), and thereafter, it is overlaid with chrome plating on the whole rotor surface of the screw (1).

In the screw (1) of the foregoing embodiment, a circulating channel is formed to connect with the outward channel (5a) of the inner tube (3)→the center hole (2)→the communicating hole (6a) on the front side the→spiral channel (6) of the flight (1b)→the communicating hole (6b) on the rear side→the inward channel (5b) on the outer side of the inner tube (3).

Thus, a medium (heat medium or refrigerant) such as a temperature regulated water is fed through the main channel (5) in the screw core (1a) and the medium is circulated not only in the screw core as in the conventional example, but also in the main channel (5) in the screw core (1a) and the spiral channel (6) on the back side of the flight (1b). Thereby, the temperature of the whole rotor of the screw (1) including the flight (1b) can be controlled uniformly stably by a direct heat exchange between the medium and the screw, thus avoiding an extruded material from adhering on a surface of the screw to stabilize quality of molded products.

Further, the temperature of the flight is controlled, not by a heat transfer through the core as the conventional example, but by a direct heat exchange between the medium and the flight; and therefore, a rise time at starting the operation can significantly be shortened compared to the conventional, and variations of an extrusion condition can immediately be followed, and thereby the production efficiency can be enhanced.

Further, the description of the foregoing embodiment is an example in which the construction of the screw relating to the invention is applied to a dual axis extruder with roller heads. However, the invention is not limitative to this, and it can display a similar effect when applied to a screw for the other type extruder such as a single axis extruder to extrude melted resin, etc. to a forming die, as long as the screw has a construction such that a medium channel for heat exchange is formed inside thereof to control the temperature of an extruded material and the screw itself.

As described hereinabove, in a screw for an extruder relating to the invention, a uniform and stable temperature control can be done on the whole screw including the flight owing to a direct heat exchange between a medium introduced therein and the screw; thereby avoiding an extruded material from adhering on the screw, and stabilizing quality of molded products. Further, a rise time at starting the operation can significantly be shortened compared to the conventional, and variations of the extrusion condition can immediately be followed, thereby the production efficiency can be enhanced.

What is claimed is:

1. An extruder, comprising:

a casing having a material outlet;

a screw comprising a screw core having a center hole and a screw flight oriented so as to advance material in the extruder toward the material outlet when the screw is rotated;

a spiral channel formed within the screw flight and fluidically connected to said center hole; and at least one tube in said center hole for causing a heat exchange fluid to flow in the spiral channel, wherein said spiral channel is formed at a side of said screw flight opposite said material outlet.

2. The extruder of claim 1, wherein said screw is tapered toward said material outlet.

3. A screw for an extruder, comprising:

a screw core having a center hole and a screw flight;

a spiral channel formed within the screw flight and having first and second ends fluidically connected to said center hole by respective first and second communicating holes;

a tube in said center hole and defining an inner channel including an opening for supplying a heat exchange fluid to the first communicating hole, and an outer channel between the inner channel and the wall of the center hole for discharging the heat exchange fluid;

a ring seal fitted around said tube and occluding said outer channel at such a location that said outer channel is in fluid communication with said second communicating hole and is fluidically isolated from said first communicating hole.

* * * * *